Sept. 9, 1958 M. G. PIERSON 2,850,863
WINDROWERS
Filed Nov. 10, 1955 5 Sheets-Sheet 1

INVENTOR.
MERLIN G. PIERSON
BY
Paul, Moore + Dugger
ATTORNEYS

Sept. 9, 1958 M. G. PIERSON 2,850,863
WINDROWERS
Filed Nov. 10, 1955 5 Sheets-Sheet 5

INVENTOR.
MERLIN G. PIERSON
BY
Paul, Moore+Dugger
ATTORNEYS

United States Patent Office 2,850,863
Patented Sept. 9, 1958

2,850,863

WINDROWERS

Merlin G. Pierson, Gatzke, Minn., assignor of one-half to Delmar Hagen, Gatzke, Minn.

Application November 10, 1955, Serial No. 546,244

14 Claims. (Cl. 56—192)

This invention relates to new and useful improvements in machines of the general type utilized for harvesting crops and depositing the cut material in windrows behind the machine.

An object of the present invention is to provide such a machine comprising a substantially rigid frame having means thereon for floatingly suspending the usual conveyor platform and sickle bar therefrom, whereby the sickle bar may follow the contour of the ground even when rough and uneven, thereby reducing to a minimum the transmission of excessive strains and stresses to the frame, when the machine is in operation.

A further object of the invention is to provide a windrower comprising a substantially rigid supporting frame supported at one end on a suitable carrying wheel, and the opposite end thereof being supported on a two-wheeled truck comprising an elongated axle having a ground engaging wheel at each end, and the main supporting frame being pivoted to said axle between said wheels, whereby the transmission of jolts and jars to the main frame, as a result of the carrying wheels passing over rough ground, is reduced to a minimum.

A further object of the invention resides in the unique three-point suspension of the platform which makes it possible to construct the platform of lighter weight material without danger of it buckling or becoming distorted, should it engage stones and other obstructions, when the machine is in use.

A further object resides in the means provided for supporting the platform on the main supporting frame, whereby the platform may be raised or lowered independently of said main frame, and in the provision of means for counter-balancing a portion of the weight of the platform, whereby the platform may readily be raised or lowered with a minimum of effort.

Other objects of the invention reside in the means provided for tilting the platform along its longitudinal axis; in the specific means provided for raising and lowering the platform upon the main supporting frame; in the means provided for driving the reel from one of the carrying wheels of the machine; in the adjustable mounting of the draft tongue on the main supporting frame, whereby the tongue when in one position, will cause the sickle to cut a full width swath, and when in another position, the sickle will cut a relatively narrower swath and will discharge the windrow directly behind the tractor; the tongue also being swingable to a transport position at one end of the apparatus to adapt the apparatus to be transported along a highway in end-to-end relation to the propelling vehicle or tractor; in the elimination of a carrying wheel at the outer or grain end of the platform; in the means provided for vertically adjusting the sickle bar to obtain the desired height of cut; in the novel means provided for vertically adjusting the reel relative to the sickle bar, and whereby it may be shifted from its lowermost to its highest position without causing any binding in the movable parts; in the provision of the two-wheeled truck at the rear of the platform, whereby when the windrower is in operation, three carrying wheels are always in contact with the ground along the width of the swather, thereby greatly improving the riding qualities of the apparatus; and in the simple and inexpensive construction of the various mechanisms of the apparatus whereby it may be manufactured at small cost.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

*Supporting frame*

Figures 5, 10:
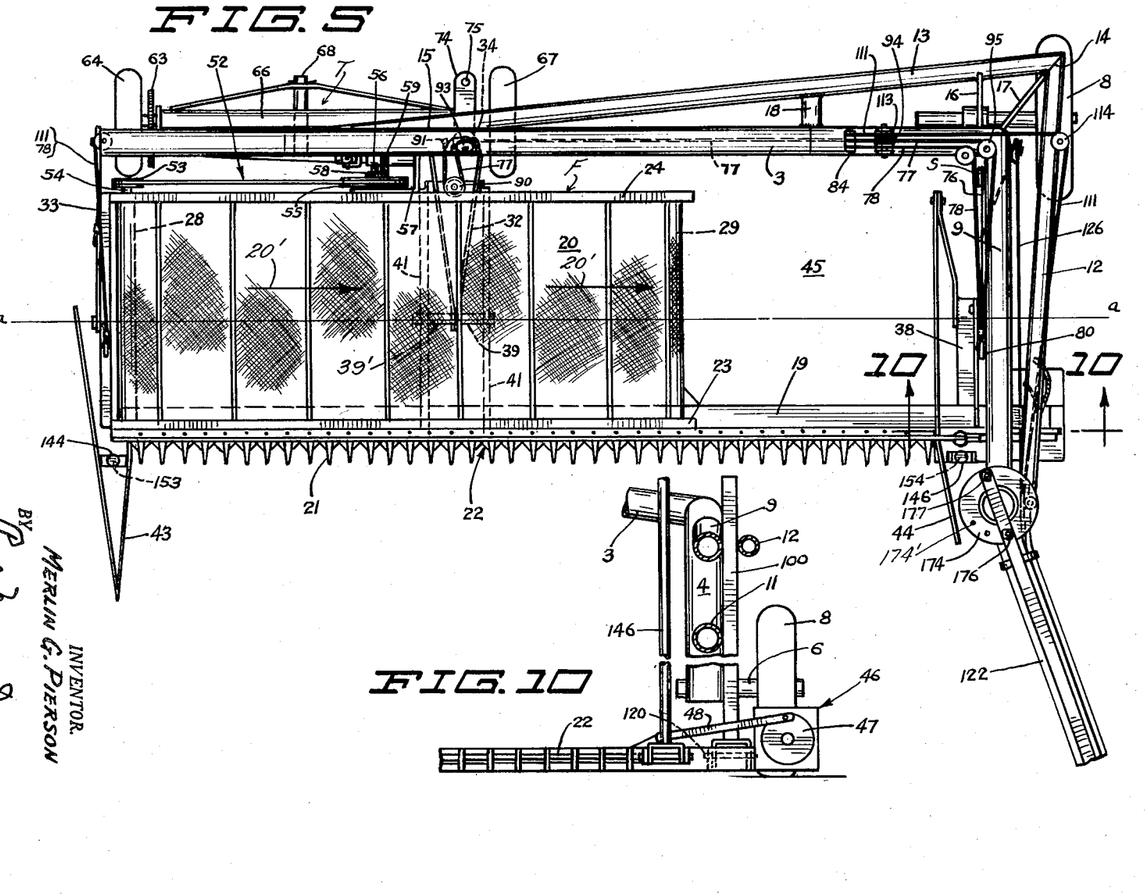
Figure 5 is a plan view of Figure 4, with some of the parts broken away.
Figure 10 is a detail sectional view substantially on the line 10—10 of Figure 5, showing a hydraulic drive for the sickle bar.
Figure 6:
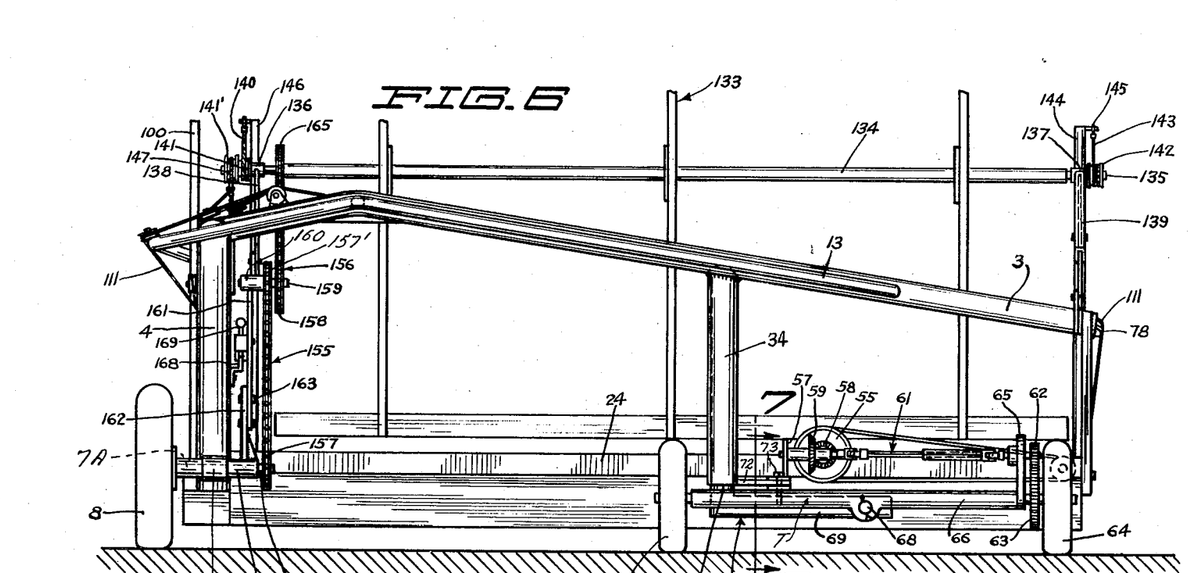
Figure 6 is a rear view of the windrower showing the pivotal mounting of the rear two-wheeled truck and the drive for the platform conveyor.

An important feature of the present invention resides in the novel construction of the main supporting frame, generally designated by the numeral 2. This frame is shown comprising a longitudinal rear frame member 3, extending from end to end of the machine, as best illustrated in Figures 5 and 6. An upright frame member or post 4 has its upper end fixedly secured to one end of frame member 3 and has a bracket 5 at its lower end. A tubular housing 6 is removably and adjustably secured in position in the bracket 5 by suitable means, not shown in the drawings. A shaft 7 is rotatably mounted in housing 6 as indicated in dotted lines in Figure 6, and has a main carrying wheel 8 secured to its outer end, as best illustrated in Figure 6.

An end frame member 9, best shown in Figure 5, has its rear end secured to the upright post 4 adjacent its upper end and extends forwardly therefrom and has its opposite end secured to the upper end portion of an upright tubular front frame member or post 10. A similar horizontal frame member 11 is spaced downwardly from frame member 9 and has its rear and front ends secured respectively to the rear and front posts 4 and 10 of the supporting frame, as clearly indicated in Figure 4.

The upper end of front frame member or post 10 has one end of a truss member 12 fixedly secured thereto, which member extends rearwardly beyond the rear frame post 4, and is secured to one end of a rear truss member 13, as indicated at 14 in Figure 5. Rear truss member 13 extends longitudinally of the machine frame in proximity to the rear frame member 3, and is disposed at a slight incline relative thereto. The opposite end of truss member 13 is suitably secured to frame member 3, as indicated at 15 in Figure 5. To simplify explanation, the end of the main frame adjacent to carrying wheel 8 will hereinafter be referred to as the "stubble end," and the opposite end of said frame will be referred to as the "grain end."

Brace elements or gusset plates 16 and 17 are interposed between frame members 3 and 13 at the rear corner of the stubble end of the machine frame, and cooperate therewith to strengthen the frame. A tubular brace element 18 is also interposed between frame members 3 and 13. The main supporting frame, as above described, is constructed of tubular stock, which provides a frame of light weight, yet one which has great strength to resist torsional strains to which a supporting frame of this general type may sometimes be subjected.

Cutting and conveying assembly

The cutting and conveying assembly is best illustrated in Figure 5. It comprises the usual sickle supporting bar, generally designated by the numeral 19, and an endless conveyor belt 20 for conveying the cut grain falling thereonto from the sickle bar 19 to the discharge opening at one end thereof, as indicated by the arrows 20' in Figure 5. The sickle bar 19 comprises the usual guards 21 and reciprocally supports the usual sickle 22.

The cutting and conveying assembly includes a rectangular auxiliary frame generally designated by the reference character F, shown comprising front and rear longitudinal members 23 and 24, respectively, and fore-and-aft cross members 25 and 26, secured at their forward ends to the cutter bar 19. The rear ends of cross members 25 and 26 are secured to the longitudinal member 24. The auxiliary frame F, above described supports the usual platform upon which the upper run of the endless conveyor belt 20 travels. The conveyor belt is supported upon rollers 28 and 29, as indicated in Figure 5. The front frame member 23 of the platform is fixedly secured to the sickle supporting bar 19, whereby the auxiliary conveyor frame F and sickle supporting bar constitute, in effect, an integral structure.

Figure 4:
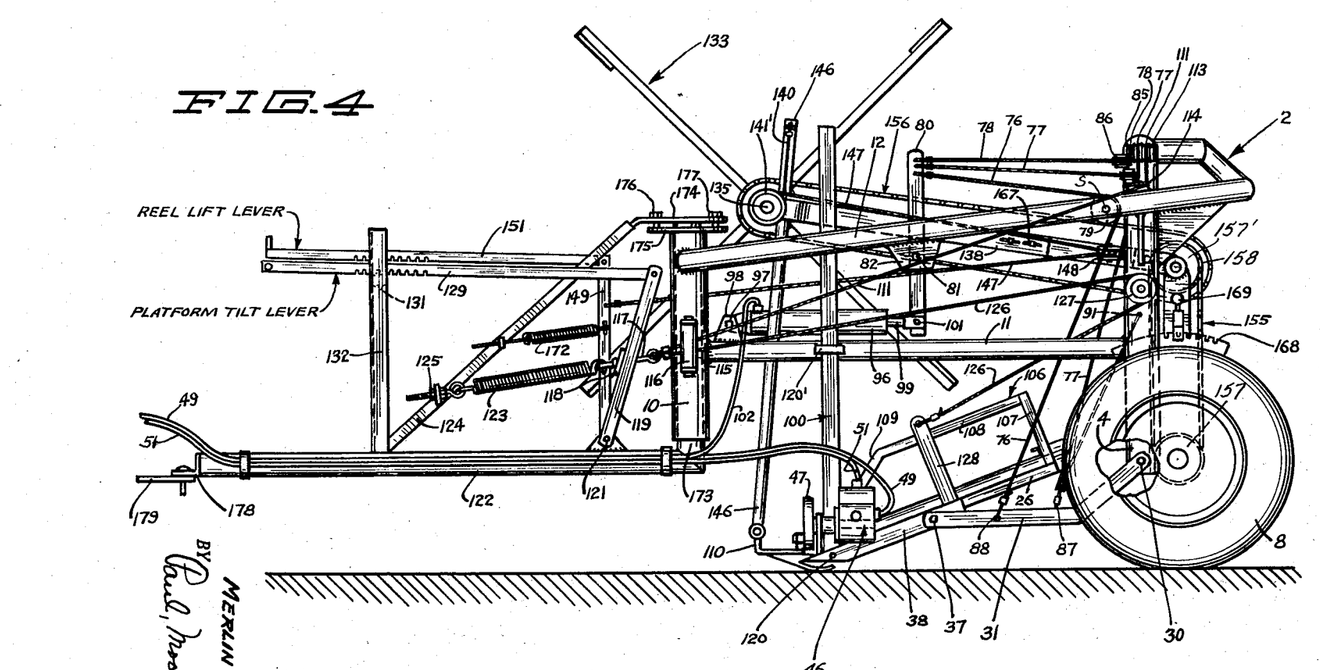
Figure 4 is an end view of the tongue end of the windrower, on a larger scale, showing the adjustable mounting of the tongue on the forward end of the main supporting frame, and also showing the forwardly extended levers for vertically adjusting the reel and for tilting the platform from the operator's seat on the tractor, some of the parts being broken away.
Figure 8:
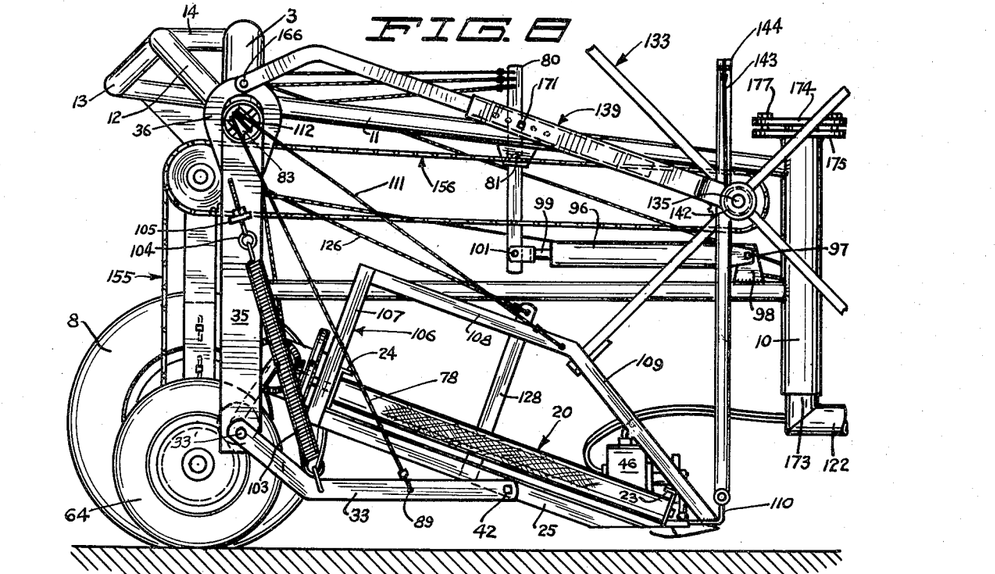
Figure 8 is a view showing the opposite, or grain end of the windrower, and also illustrating the unique manner of floatingly supporting the platform, whereby the sickle bar may freely follow the contour of the ground.

The sickle bar is preferably disposed at an angle with respect to the plane of the platform, as indicated in Figures 4 and 8, whereby the plane of the sickle supporting bar may be disposed in substantially parallel relation to the ground surface, while the rear end of the platform is tilted upwardly, as best shown in Figure 8.

Another important feature of the invention resides in the means provided for supporting the platform on the main supporting frame, whereby the platform and sickle bar are substantially balanced so that the sickle bar may readily follow the contour of the ground, when the machine is in operation.

To thus support the platform and sickle bar, a pair of forked arms 31 and 32 and a single arm 33 are pivoted to the main supporting frame, as will be understood by reference to Figures 4, 5 and 6. As best shown in Figures 4 and 5, forked arm 31 has its rear extremities pivoted to the lower end of post 4, as indicated at 30. Center arm 32 has its rear extremities pivoted to an upright frame member or post 34, as indicated at 32' in Figure 7a. The upper end of post 34 is fixedly secured to the longitudinal frame member 3.

The single arm 33 is pivoted to the lower end of a depending frame member 35, as indicated at 33' and its upper end is fixedly secured to the adjacent end of the rear tubular frame member 3, as shown in Figure 8. A suitable reinforcing plate 36 is attached to the opposite edges of frame member 35 and to the adjacent end of frame member 3, whereby the depending frame member 35 becomes, in effect, an integral part of longitudinal frame member 3.

The forward end of arm 31 is pivoted at 37 to a rearwardly extending member 38 of the sickle supporting bar 19. The intermediate arm 32 has its forward end pivoted to a member 39 secured to cross members 41 of the conveyor belt supporting frame, as indicated at 39' and as will be understood by reference to Figure 5. Arm 33 at the grain end of the conveyor platform is pivoted to the end member 25 of the platform, as indicated at 42 in Figure 8. Pivots 37, 39' and 42 are located on a common axis a—a, as indicated in Figure 5, whereby platform and sickle bar may freely pivot about said axis in the operation of the machine.

Secured to the grain end of the conveyor belt supporting frame is a grain divider board 43, of well known construction, which extends forwardly of the sickle bar and serves to divide the standing grain prior to its contact with the sickle bar. A suitable divider board 44 is shown secured to the rearwardly extending member 38 of the sickle bar, as illustrated in Figure 5.

The conveyor belt supporting platform is relatively shorter than the length of the sickle bar, thereby to provide an opening 45 between the discharge end of the conveyor belt and the stubble end of the machine frame, as best illustrated in Figure 5. Opening 45 is of ample size to permit free passage of the cut grain therethrough onto the ground or stubble in the form of a windrow, as is well known in apparatus of this general type.

Sickle operating mechanism

The sickle operating mechanism, as illustrated in Figures 4 and 10, is shown comprising a power unit, generally designated by the numeral 46, which may be supported on the end of the sickle bar supporting frame. Motor 46, which may be in the form of a hydraulic motor, has a driving connection with the usual pitman or crank wheel 47, which in turn is connected to the sickle 22 by a pitman rod 48. Flexible conduits 49 and 51 provide fluid circulating connections between the motor 46 and a fluid circulating pump, not shown, mounted upon the tractor and driven by the tractor engine. Such a hydraulically operated drive has been found very practical, and may readily be connected to a fluid circulating pump driven by the tractor engine.

If, however, it should be found more desirable to drive the sickle bar from the usual power take-off shaft of the tractor engine, such a drive may readily be substituted for the hydraulic drive herein shown, without departing from the scope of the invention.

Conveyor belt drive

The conveyor belt is driven independently of the sickle bar by means of a flexible drive, generally designated by the numeral 52. This drive comprises a pulley or sheave 53 secured to the supporting shaft 54 of conveyor roller 28, and a drive pulley or sheave 55, shown mounted upon a stub shaft 56 supported in a bracket 57 secured to the machine frame. See Figure 5.

Figures 7, 7A:
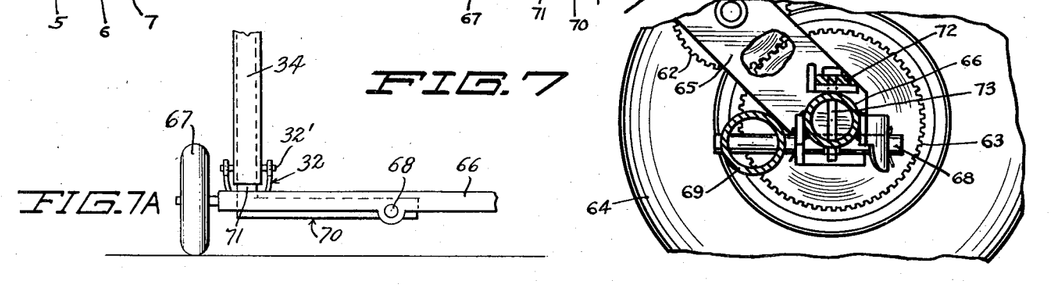
Figure 7 is a detail sectional view substantially on the line 7—7 of Figure 6.
Figure 7A is a fragmentary view showing the pivotal connection between one of the platform supporting arms and the machine frame.

Pulley 55 has a bevel pinion 58 secured thereto which meshes with a bevel gear 59 driven by a telescopic drive shaft 61. Shaft 61 is shown driven from a pinion 62 meshing with a drive gear 63 secured to and rotatable with a drive wheel 64, shown in Figures 5, 6, 7 and 9. One end of the telescopic shaft 61 is supported in a suitable bracket 65, preferably welded to a horizontally disposed tubular axle 66, as best shown in Figure 7. Axle 66 is provided at its opposite end with a carrying wheel 67, and has its intermediate portion pivoted at 68 to the outer extremity of a horizontal arm 69 of an L-shaped supporting member, generally designated by the numeral 70. The vertical arm or leg 71 of member 70 is rotatably supported in the upright tubular frame member 34, as clearly illustrated in Figure 6.

The elongated axle 66 and its carrying wheels 64 and 67 cooperate to provide a wheeled truck T for supporting the grain end of the conveyor platform and sickle bar, as will be understood by reference to Figures 3, 5, 6 and 9 of the drawings. Telescopic shaft 61 permits the axle to freely rock about the pivot pin 68, whereby raising and lowering of the grain end of the machine as a result of traveling over uneven and rough terrain, is reduced to a minimum, particularly if only one of the wheels 64 or 67 drops into a depression or passes over a bump.

This results because of the pivotal mounting of axle 66, whereby the up and down movement transmitted to the conveyor platform is reduced to one-half of the actual up and down movement of wheels 64 and 67, when traveling over rough uneven ground surfaces. The flexible belt drive 52 for transmitting power from pulley 55 to pulley 53 also permits axle 66 to freely rock about pivot 68 without effecting the operation of the belt drive, as will readily be understood by reference to Figures 7 and 9.

Figure 3:
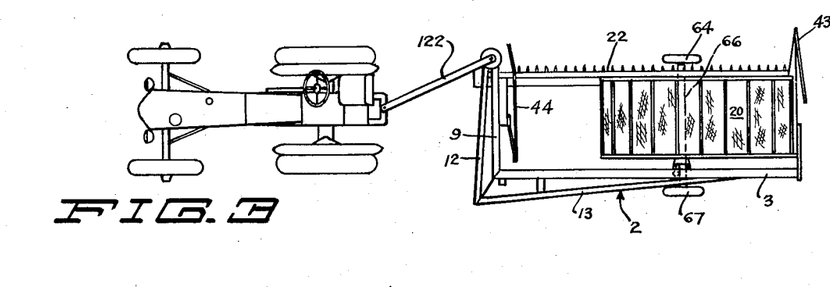
Figure 3 is a view showing the windrower coupled to the tractor in endwise relation thereto for transporting it along a highway, and through an ordinary farm gate.
Figure 9:
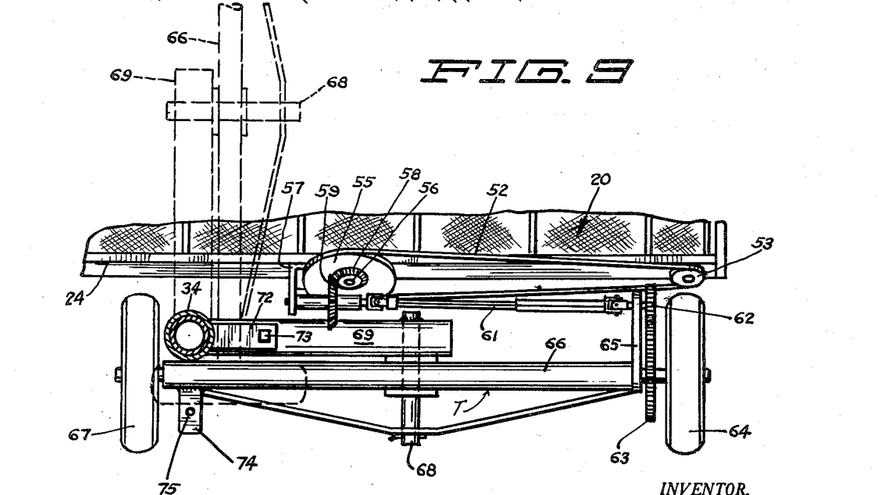
Figure 9 is a detail view showing in full and dotted lines, the two positions of the rear two-wheeled truck, and also the means for driving the platform from one of said wheels.

The two-wheeled truck T, including wheels 64 and 67 and axle 66, constitutes another important feature of the invention, in that when the apparatus is to be transported from one place to another, or along a highway, the two-wheeled truck may be swung from its normal position at the rear of the apparatus, to a transport position, at right angles to the longitudinal center line of the machine frame, as indicated by the dotted lines in Figure 9, and shown also in Figure 3.

Means is provided for selectively locking the axle in its two positions, as, for example, a lug 72 shown secured to the upright frame member 34 and extending laterally therefrom in overlying relation to the horizontal arm 69 of the L-shaped member 70, as best illustrated in Figure 9. Lug 72 is apertured to receive a bolt 73 which may be received in threaded engagement with the horizontal leg or member 69, thereby to secure the L-shaped member 70 in its normal position.

To lock the axle 66 in transport position, as indicated by the dotted lines in Figure 9, axle 66 has a rearwardly extending lug 74 having an aperture 75 therein adapted to register with the aperture in lug 72, when bolt 73 is removed and the horizontal leg 69 of member 70 is swung inwardly under the platform to transport position. A bolt may then be inserted through the aligned apertures in lugs 72 and 74, thereby to lock the axle 66 in transport position, as will readily be understood by reference to Figure 9.

*Platform lifting mechanism*

The cutting and conveying assembly, as hereinbefore stated, is in the form of a composite structure, and is suspended from the main supporting frame by three cables 76, 77 and 78. These cables are connected respectively to the arms 31, 32 and 33, as shown in Figures 4, 5 and 8. Cable 76 extends upwardly from arm 31 and passes over a small sheave 79 shown mounted on the end member 9 of the main supporting frame, as indicated at S in Figures 4 and 5. From sheave 79 cable 76 extends forwardly and is secured to the upper end of an arm 80, shown pivoted at 81 to a bracket 82 secured to frame member 9.

Cable 78 at the grain end of the platform is secured to arm 33 at 89 and extends upwardly from said arm and over a sheave 83 mounted in the adjacent end of the rear longitudinal frame member 3, as best shown in Figure 8. From sheave 83 cable 78 extends lengthwise through frame member 3 and out through an opening 84 in the wall thereof, and thence over a pair of sheaves 85 and 86. Sheaves 85 and 86 are disposed at right angles to one another and cooperate to direct the cable 78 in a forward direction, as indicated in Figure 4. The end of cable 78 is secured to arm 80 adjacent to cable 77, as best illustrated in Figure 4.

The third or intermediate cable 77, is connected to arm 32 at 87, located relatively closer to the pivotal mounting of arm 32 with the main supporting frame, than the pivotal mountings of arms 31 and 33 therewith. This is necessary in the present instance in order that cable 77 may adequately clear the rear portion of the conveyor belt platform, as will be understood by reference to Figure 4.

By thus connecting cable 77 to arm 32 at a point located relatively closer to the pivotal mounting of said arm on the main frame, than the pivotal mountings of arms 31 and 33 thereon, means must be provided to compensate for the decrease in arm travel at point 87, as compared to the arm travel at cable attaching points 88 and 89 of arms 31 and 33, respectively.

To thus compensate for the decrease in arm travel at point 87 of arm 32, a sheave 90 is secured to arm 32 at point 87. The adjacent end of cable 77 is anchored at 91 to a fixed portion of the main supporting frame, such as the rear longitudinal frame member 3. From its point of anchorage with said frame, cable 77 extends downwardly around sheave 90, and thence upwardly through an opening in frame member 3 and over a sheave 93. From sheave 93 cable 77 passes through frame member 3 to the opening 84 therein, and thence over pulleys 94 and 95 to lever 80, as will be understood by reference to Figures 4 and 5.

Thus, by utilizing sheave 90 and anchoring the adjacent end of cable 77 to the main supporting frame, as above described, when arm 80 is actuated to raise or lower the platform, the movements of arms 31, 32 and 33 will be identical so that the platform and sickle bar may be readily raised or lowered at any time, when the apparatus is in operation, without causing any binding or abnormal strains in the platform and its operating mechanism.

Means is provided for actuating arm 80 to effect raising or lowering of the platform and sickle bar, and, as here shown, comprises a hydraulic cylinder 96 having one end pivoted at 97 to a bracket 98 secured to frame member 11 adjacent to the upright tubular post 10 of the main supporting frame. Mounted for reciprocal movement within cylinder 96 is a piston rod 99 which projects from the opposite end of the cylinder and is pivotally connected to the lower end of arm 80, as indicated at 101 in Figure 4. A suitable conduit 102 has one end connected to cylinder 96 and its opposite end to a source of pressure fluid located on the tractor, whereby the usual piston within the cylinder 96 may be actuated to impart swinging movement to arm 80, thereby to effect raising or lowering of the platform and sickle bar, as will be understood.

Means is preferably provided for counter-balancing a portion of the weight of the platform and sickle bar assembly. As best shown in Figure 8, such means may consist of a spring 103 having one end pivotally connected to arm 33 and its opposite end to an eye bolt 104 adjustably mounted in a bracket 105 secured to the depending member 35 of the main supporting frame. Spring 103 is constantly under tension and tends to swing arm 33 upwardly, thereby to relieve the supporting cables 76, 77 and 78 from a portion of the weight of the platform and sickle bar assembly.

If desired, arms 31 and 32 may be provided with similar springs, not shown, adapted to cooperate with spring 103 to yieldably carry a portion of the weight of the assembly. Spring 103, in addition to relieving the platform suspending cables of a portion of the weight of the platform and sickle bar assembly, also causes the sickle bar to more readily follow the contour of the ground surface, whereby the sickle bar may pass over raised portions or depressions in the ground surface substantially without interference therewith. The specific mounting of the platform and sickle bar actually cause the sickle bar to "float" over the surface of the ground, and over obstacles such as moderate size rocks and the like.

An upright stabilizing member 100 has its lower end pivotally connected to the sickle supporting bar 19, as indicated at 120 in Figures 4 and 10, and extends upwardly therefrom through a guide 120' on frame member 11, and between frame members 9 and 12. The intermediate portion of stabilizing member 100 bears against frame member 11, whereby member 100 resists swinging movement of the sickle bar and platform in a direction towards the grain end of the platform.

*Platform tilting mechanism*

The platform tilting mechanism is best illustrated in Figures 4 and 8, and comprises an upright bracket or end frame structure, generally designated by the numeral 106, including an upright member 107, a horizontal member 108, and a forwardly and downwardly directed member 109, having its forward end secured to a bracket 110, fixed to the grain end of the sickle supporting bar 19, as best illustrated in Figure 8. End frame structure 106 has one end of a cable 111 secured to the upper horizontal frame member 108 thereof at a location substantially directly above pivot 42.

Cable 111 extends rearwardly and upwardly over a sheave 112, rotatably mounted on the adjacent end of rear frame member 3, adjacent to sheave 83 with which platform lifting cable 78 has a running connection, as hereinbefore described. The opposite end portion of cable 111 passes through opening 84 in rear frame member 3, and over guide sheaves 113 and 114. From sheave 114, cable 111 extends forwardly through a guide opening 115 provided between the periphery of post 10 of the main frame and a vertically disposed anti-friction roller 116, indicated in Figure 4. The adjacent end of cable 111 is shown secured to one end of an eye-bolt 117, slidably supported in a guide 118, secured to an arm 119, pivoted at 121 to the draft tongue 122. A suitable spring 123 has one end connected to the opposite end of eye-bolt 117. The other end of spring 123 is shown adjustably anchored to a diagonal brace member 124, as indicated at 125, constituting a portion of the tongue assembly.

A second cable 126 has one end secured to eye-bolt 117, and extends rearwardly therefrom over a sheave 127 secured to the upright frame member 4, as indicated in Figure 4. The opposite end of cable 126 is secured to the upper end of an arm 128, fixedly secured to the rearwardly extending member 38 of the sickle bar supporting member 19.

A forwardly extending hand lever 129 is pivotally connected to the upper end of arm 119, and has its forward end portion slidably supported in a suitable guide 131 provided on a standard 132, secured to the draft tongue 122, as shown in Figure 4. Lever 129 may have its bottom edge notched as shown, adapted to engage a fixed detent (not shown) on guide 131, thereby to secure the lever in adjusted position.

Spring 123 serves to counter-balance a portion of the weight of the front portion of the platform, including the sickle supporting bar 19. By thus counter-balancing the front portion of the platform, it may readily glide over the ground surface, even when such surface may be rough and uneven, and over rocks and other obstructions.

*Reel and mounting means therefor*

A reel, generally designated by the numeral 133, comprises a tubular shaft 134 mounted for rotation on a shaft 135, supported in bearings 136 and 137, provided, respectively, at the forward ends of a pair of struts 138 and 139, as indicated in Figure 6. Secured to the opposite ends of shaft 135 are cable drums 141 and 142. A short cable 143 has one end suitably secured to drum 142 and is wrapped several times around the drum and has its opposite end secured to the upper end of an upright supporting member or post 144, as indicated at 145.

A similar post 146 is provided at the stubble end of the machine frame and has one end of a cable 140 secured thereto. Cable 140 is wrapped around drum 141 and has its opposite end secured thereto in a manner similar to cable 143 at the opposite end of the reel. A drum 141', preferably slightly larger than drum 141, is secured to drum 141 for direct rotation therewith, and has one end of a cable 147 wrapped several times therearound and secured thereto. Cable 147 extends rearwardly around a sheave 148 secured to the machine frame, as indicated in Figure 4. From sheave 148 cable 147 extends forwardly and is secured to the upper end portion of an arm 149 pivoted at 121 to the tongue in a manner similar to arm 119. A horizontal operating lever 151 is pivoted to the upper end of arm 149 and has its forward end slidably supported in guide 131. The bottom edge of lever 151 is notched as shown in Figure 4, adapted to receive a detent, not shown, thereby to retain lever 151 in adjusted position. The upright supporting posts 144 and 146 are shown pivotally connected to the opposite ends of the sickle bar supporting member 19, as indicated at 153 and 154, respectively, in Figure 5.

The reel is driven from the main ground-engaging wheel 8, as best illustrated in Figures 4 and 6, by dual chain drives 155 and 156. Chain 155 has running connections with sprockets 157 and 157', secured respectively to shaft 7 of ground-engaging wheel 8, and a jack shaft 159 rotatably mounted in a hub 160 secured to the upper end of an arm 161. The lower end of arm 161 is adjustably secured to an arm 162 of hub 6 by bolts 163, as indicated in Figure 6. The adjustable connections between arm portions 161 and 162 provide means for tensioning chain 155, as will be understood.

Chain 156 has running connections with sprockets 158 and 165 secured respectively to jack shaft 159 and the tubular shaft 134 of the reel. The reel supporting shaft 135 is retained in spaced parallel relation to the rear longitudinal frame member 3 by the struts 138 and 139. Strut 138 at the stubble end of the machine is shown connected to the hub 160 which supports the jack shaft 159, as will be understood by reference to Figures 4 and 6. Strut 139 at the grain end of the machine has its rear end pivoted at 166 to the machine frame, as shown in Figure 8. Strut 138 is adapted for longitudinal adjustment to tension the chain 156, as indicated at 167 in Figure 4. Strut 139 is longitudinally adjustable to permit fore-and-aft adjustment of the reel with respect to the conveyor belt. A quadrant 168 is secured to the upright frame member 4 adapted to be engaged by a latch 169 to secure the arm 161—162 in adjusted position. Quadrant 168 and latch 169 thus cooperate to retain the reel in its adjusted position, fore-and-aft. When the reel is to be adjusted in a fore-and-aft direction, bolt 171 in strut 139 is removed to permit said strut to elongate or contract, depending upon the adjustment of the reel in the fore-and-aft direction. When secured in such position by latch 169, the bolt 171 is inserted through aligned apertures in the two sections of strut 139, whereby the reel shaft is maintained in parallel relation to the sickle bar.

When it is desired to raise the reel with respect to the sickle bar, the operator exerts a forward pull on lever 151, whereupon cable 147 will rotate drum 141', and drum 141, to which drum 141' is secured, which will effect rotation of the reel shaft 135. Such rotation of shaft 135 will cause drums 141 and 142 to "roll" upwardly or downwardly on the fixed end portions of their respective cables 140 and 143, thereby causing the reel to raise or lower, depending upon the direction of rotation of shaft 135. When the reel is to be lowered, the tension in cable 147 is released, by rearward movement of lever 151, whereupon the reel is lowered by gravity. Drums 141 and 142, and their respective cables 140 and 144 also cooperate to maintain the reel shaft in parallel relation to the sickle bar at all times. A spring 172 is interposed between arm 149 and the diagonal brace 124 of the tongue assembly for counter-balancing a portion of the weight of the reel.

*Tongue assembly*

The tongue assembly is best illustrated in Figures 4 and 5, and comprises the forwardly extending tongue 122, hereinbefore referred to. Tongue 122 has an upright member 173 at its rear end rotatably received in the tubular member 10 of the main supporting frame. The upright member 173 of the tongue has an enlarged disc-like head 174 secured to its upper end, which is positioned directly above an annular flange 175 fixedly secured to the upper end of frame member 10. A series of apertures are provided in head 174 and disc 175 for selectively receiving bolts 176 and 177 for locking the tongue in fixed adjusted position with respect to the machine frame. The tongue is provided at its forward end with a suitable coupling element 178 for coupling the tongue to the usual drawbar 179 of a tractor, partially shown in Figure 4.

Figure 1:
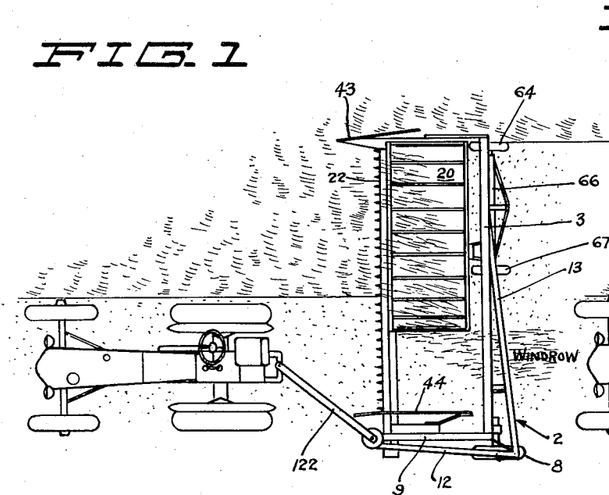
Figure 1 is a diagrammatic plan view showing the windrower coupled to a tractor, as when cutting a narrow swath, and whereby the windrow is discharged onto the ground or stubbles behind the tractor.
Figure 2:
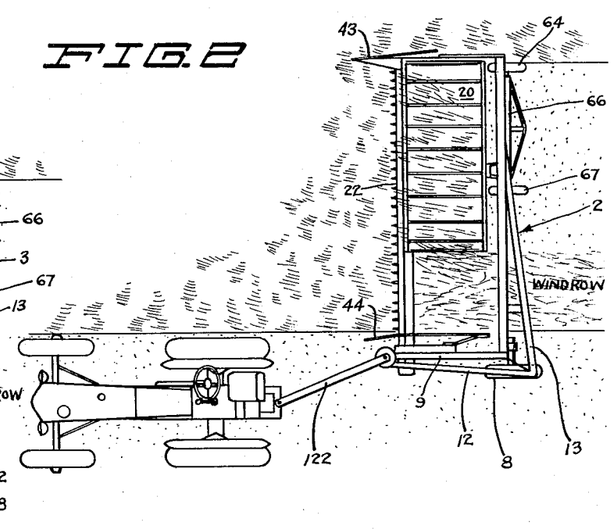
Figure 2 is a similar view, but showing the windrower laterally offset from the travel path of the tractor to cut a full width swath.

The pivotal mounting of the tongue in the tubular member 10 of the main supporting frame makes it possible to quickly laterally adjust the windrower with respect to the travel path of the tractor, as clearly illustrated in Figures 1 and 2. In Figure 1 the windrower is shown positioned to cut a narrow swath, whereby the windrow is deposited upon the ground directly behind the tractor. This is also the preferred manner of coupling the windrower to the tractor, when traveling to and from the field, because when so coupled, the tractor is positioned within the ends of the windrower, whereby the entire apparatus may readily pass through a normal width farm gate. In Figure 2 the windrower is positioned to cut a relatively wider swath, whereby the windrow is deposited on the ground adjacent to one side of the travel path of the tractor.

In Figure 3 the windrower is shown arranged to be transported through a narrow farm gate or along a highway. When so arranged, the draft tongue 122 is swung around to the end of the apparatus and is securely locked in such position by means of the bolts 176 and 177. It will also be noted by reference to Figure 3, that when the machine is to be transported from one place to another, the axle 66 of the two-wheeled truck, shown in Figure 9, is swung to a position under the conveyor belt frame, as indicated in Figures 3 and 9, and is secured in such position, as hereinbefore stated. It is also necessary when transporting the apparatus from one place to another, as shown in Figure 3, to remove the ground-engaging wheel 8 at the stubble end of the machine.

The novel windrower or swather herein disclosed has proven extremely practical in actual operation. The main supporting frame, which is preferably constructed of tubular stock material, as hereinbefore stated, presents the utmost in strength and rigidity with minimum weight. Of importance also is the unique manner in which the platform and sickle bar are suspended from the main frame by cables 76, 77 and 78, and including the pivotal mounting of the platform upon the arms 31, 32 and 33.

By thus suspending the platform, the sickle bar may actually "float" over the surface of the ground, as there is no tendency for the sickle bar to dig into the ground, as it would be likely to do if moving over the ground surface with considerable weight imposed thereon. Thus, the sickle bar may freely glide over ordinary obstructions and depressions in the ground surface without interference therefrom.

The foregoing detailed description has been given for clearness of understanding only, and no unnecessary limitations should be understood therefrom, and the appended claims should be construed as broadly as permissible in view of the prior art.

I claim as my invention:

1. In a windrowing machine, a mobile main supporting frame of substantial width and having a grain end and a stubble end, an auxiliary frame mounted in said main frame and terminating short of the length thereof to provide a grain discharge opening between said auxiliary frame and the stubble end of said main supporting frame, a sickle bar mounted along the front edge of said auxiliary frame and extending substantially the length of said main frame, an endless conveyor on the auxiliary frame for receiving the cut grain and delivering it to said discharge opening, drive means for the sickle bar and said conveyor, and a plurality of forwardly extending arms having their rear ends pivoted to the main frame and their forward ends to the auxiliary frame, whereby said auxiliary frame may pivot about a horizontal axis to permit the sickle bar to follow the contour of the ground.

2. A windrowing machine according to claim 1, wherein the mobile frame is constructed of tubular stock to provide a very rugged and rigid frame of light weight.

3. A windrowing machine according to claim 1, wherein the conveying means is pivotally supported upon the forward ends of a plurality of forwardly extending arms having their rear ends pivoted to the main supporting frame for pivotal movement about a common axis.

4. In a windrowing machine, a main supporting frame of substantial length transversely to the direction of travel and having a grain end and a stubble end, said frame comprising an elongated member extending the length of the frame and having an upright frame member or post secured thereto at the stubble end of the frame, a forwardly extending frame member having its rear end secured to said upright frame member or post and having its forward end secured to an upright tubular member, carrying wheels for said main supporting frame, a draft tongue having an upright member at its rear end pivotally mounted in said upright tubular member, and means on said tubular member for securing the upright member of the tongue in adjusted position in said upright tubular member.

5. A windrowing machine according to claim 4, wherein a plurality of arms are pivoted to the rear portion of the machine frame and extend forwardly therefrom, a conveyor platform having its intermediate portion pivoted to the forward ends of said arms, whereby said platform may pivot about a horizontal axis a cutter bar secured to the front portion of the conveyor platform, the pivotal mounting of said platform permitting the sickle bar to closely follow the contour of the ground, and a lever operatively connected to said arms to effect vertical adjustment of the platform and sickle bar.

6. A crop harvesting and windrowing machine according to claim 5, wherein hydraulic means is provided for operating said lever to raise or lower the platform and cutter bar.

7. In an apparatus of the class described, a main supporting frame, said frame comprising an elongated tubular frame member extending the length thereof, a plurality of arms having their lower ends pivoted to the lower portion of said frame and extending forwardly therefrom, an auxiliary frame having its intermediate portion pivoted to the forward ends of said arms and adapted for pivotal movement thereon about a horizontal axis, a sickle bar constituting the front edge of said auxiliary frame and extending the length of said main frame, an endless conveyor belt on the auxiliary frame, said auxiliary frame and endless belt terminating short of the sickle bar to provide a grain discharge opening through which the cut grain may be discharged onto the stubble in the form of a windrower, a lifting cable secured to each of said arms and having running connections with sheaves mounted on said elongated frame member, portions of certain of said cables being threaded through said elongated frame member, and power means at the stubble end of the machine frame for actuating said cables to raise or lower the sickle bar and platform.

8. An apparatus according to claim 7, wherein other cables are provided for relatively tilting the platform about said horizontal axis, thereby to vertically adjust the height of the sickle bar relative to the ground, and said other cables being operable by a single control lever located adjacent to the lever for effecting vertical adjustment of the reel.

9. In a windrowing machine, a main supporting frame of elongated construction transversely to the direction of travel and having a grain end and a stubble end, an auxiliary platform pivotally mounted in said frame and supporting an endless conveyor belt, a sickle bar secured to the front edge of said auxiliary platform and extending substantially the length of the machine, independent drive means for driving the sickle bar, and the conveyor belt, a reel, an upright post pivoted at each end of the sickle bar for supporting the reel, means for vertically adjusting the reel on said posts, and a pair of struts having their forward ends pivotally connected to the reel supporting shaft and having their rear ends pivoted to the machine frame, whereby said struts cooperate with said upright posts to support the reel in operative position over the sickle bar, and means for driving said reel.

10. In a windrowing machine, a main supporting frame of elongated construction transversely to the direction of travel and having a grain end and a stubble end, cutting and conveying means adjustably mounted on said frame, the grain end of said frame being supported on a two-wheeled truck, an L-shaped support for said truck comprising a horizontal leg and a vertical leg, said vertical leg being rotatably supported in a tubular bearing member on the main supporting frame, said two-wheeled truck comprising an elongated axle, a pivot pin connecting the intermediate portion of said axle to the outer end portion of said horizontal leg, whereby the axle may freely oscillate about the axis of said pivot pin to permit the wheels of said two-wheeled truck to follow the contour of the ground, means for locking said horizontal leg in its normal position lengthwise of the main frame, and whereby the carrying wheels at the ends of said axle are spaced apart lengthwise of the machine frame, means whereby the horizontal leg may be swung to a position parallel to the direction of travel, thereby to position the wheels of said truck at opposite sides of the machine frame to adapt the machine to be transported in an endwise direction, a draft tongue secured to the stubble end of the machine frame, and means for selectively securing said tongue in cutting or transport position.

11. In a windrowing machine according to claim 10, wherein the main supporting frame comprises an intermediately disposed upright tubular frame member in which the vertical leg of the L-shaped truck supporting member is mounted for rotary adjustment, said main supporting frame also having a vertically disposed tubular member at its front side for rotatably supporting the draft tongue, and means at the upper end of said front tubular member for locking the tongue in a selected adjusted position.

12. In an apparatus of the class described, a main supporting frame of elongated cross section transversely to the direction of travel and having a grain end and a stubble end, the major portion of said frame being constructed of tubular stock, a two-wheeled truck pivotally connected to said frame adjacent to the grain end thereof and comprising an axle adapted for rocking movement about an axis normally disposed in parallel relation to the direction of travel of the apparatus, a single carrying wheel at the stubble end of said frame, an auxiliary frame pivotally supported in said main frame and adapted for vertical adjustment thereon, a sickle bar mounted along the front edge of said auxiliary frame, an endless conveyor belt carried on said auxiliary frame to receive the cut grain from the sickle bar and independent drives for the sickle bar and conveyor.

13. In a windrowing machine, a main supporting frame of substantial length transversely to the direction of travel and having a grain end and a stubble end, dual carrying wheels at the grain end of the frame, a single carrying wheel at the stubble end thereof, a sickle bar along the front edge of said frame, a conveyor behind the sickle bar extending from the grain end of the machine towards the stubble end but terminating short thereof to provide a crop discharge opening between the conveyor and the stubble end of the machine frame through which the cut grain is discharged from the conveyor onto the stubble in the form of a windrow, an upright post at each end of the sickle bar, a reel, the mounting means for said reel comprising a tubular shaft which constitutes an integral part of the reel, a second shaft extending lengthwise through said tubular shaft, bearings secured to the upper ends of said posts for supporting said second shaft, a drum secured to each end of said second shaft, a cable wound about each of said drums and each having one end secured to its respective drum, and the opposite ends of said cables being secured to the top ends of their respective reel supporting posts, and means for relatively rotating said drums to cause said cables to be wound onto or off their respective drums, thereby to raise or lower the reel supporting shaft and reel upon said upright posts.

14. In a windrowing machine, a main supporting frame of substantial length transversely to the direction of travel and having a grain end and a stubble end, dual carrying wheels at the grain end of the frame, a single carrying wheel at the stubble end thereof, a sickle bar along the front edge of said frame, a conveyor behind the sickle bar extending from the grain end of the machine towards the stubble end but terminating short thereof to provide a crop discharge opening between the conveyor and the stubble end of the machine frame through which the cut grain is discharged from the conveyor onto the stubble in the form of a windrow, an upright post at each end of the sickle bar, a reel, the mounting means for said reel comprising a tubular shaft which constitutes an integral part of the reel, a second shaft extending lengthwise through said tubular shaft, bearings secured to the upper ends of said posts for supporting said second shaft, a drum secured to each end of said second shaft, a cable wound about each of said drums and each having one end secured to its respective drum, and the opposite ends of said cables being secured to the top ends of their respective reel supporting posts, a sheave secured to one end of said second shaft, and a cable having one end anchored to the periphery of said sheave, the opposite end of said cable being connected to an operating lever located convenient to the operator's seat.

References Cited in the file of this patent

UNITED STATES PATENTS

| 1,728,150 | Christiansen | Sept. 10, 1929 |
| 2,352,479 | Huddle | June 27, 1944 |
| 2,395,672 | Kranick et al. | Feb. 26, 1946 |
| 2,654,983 | Peake et al. | Oct. 13, 1953 |
| 2,662,362 | Beasley | Dec. 15, 1953 |
| 2,720,744 | Ashton et al. | Oct. 18, 1955 |
| 2,762,183 | Linscheid | Sept. 11, 1956 |